United States Patent
Lagrange et al.

(10) Patent No.: US 8,094,561 B2
(45) Date of Patent: Jan. 10, 2012

(54) METHOD AND A DEVICE FOR ACKNOWLEDGING DATA RECEIVED BY A COMMUNICATION DEVICE IN A COMMUNICATION NETWORK

(75) Inventors: Pascal Lagrange, Rennes (FR); Patrice Nezou, Saint Sulpice la Forêt (FR)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/336,496

(22) Filed: Dec. 16, 2008

(65) Prior Publication Data

US 2009/0161572 A1 Jun. 25, 2009

(30) Foreign Application Priority Data

Dec. 20, 2007 (FR) ...................................... 07 08915

(51) Int. Cl.
*H04J 1/16* (2006.01)
(52) U.S. Cl. .......................................... 370/235; 370/428
(58) Field of Classification Search .................. 370/229, 370/235, 351, 389, 395.1, 395.5, 395.52, 370/400, 412, 413, 419, 420, 428, 464, 474
See application file for complete search history.

(56) References Cited

U.S. PATENT DOCUMENTS

| 6,078,564 | A  | * | 6/2000  | Lakshman et al. | ............. | 370/235 |
| 2003/0081664 | A1 | * | 5/2003  | Lu et al. | ......................... | 375/222 |
| 2003/0120822 | A1 | * | 6/2003  | Langrind et al. | ............... | 709/251 |
| 2005/0063378 | A1 | * | 3/2005  | Kadous | .......................... | 370/389 |
| 2005/0117515 | A1 | * | 6/2005  | Miyake | .......................... | 370/231 |
| 2005/0226239 | A1 | * | 10/2005 | Nishida et al. | ................ | 370/389 |
| 2007/0025383 | A1 |   | 2/2007  | Katar et al. |   |   |

FOREIGN PATENT DOCUMENTS

| EP | 1729436 A2 | 12/2006 |
| FR | 2921777 | 4/2009 |
| WO | 00/52868 A2 | 9/2000 |

OTHER PUBLICATIONS

French Search Report and Written Opinion dated Oct. 17, 2008 in corresponding FR 0708915.

* cited by examiner

*Primary Examiner* — Kwang B Yao
*Assistant Examiner* — Obaidul Huq
(74) *Attorney, Agent, or Firm* — Fitzpatrick, Cella, Harper & Scinto (57) ABSTRACT

The disclosure provides an acknowledgement of data received by a communication device, the data being received by data packets, with each data packet comprising a plurality of data blocks. The communication device determines, for a data packet, a number of data blocks whose data can be processed correctly. The communication device further sends an acknowledgement for at least one data block in the data packet if the number of data blocks whose data can be processed correctly is between a first and a second threshold. The communication device also sends, for the data packet, a piece of information at packet level representing the number of data blocks whose data can be processed correctly if the number of data blocks whose data can be processed correctly is lower than the first threshold or higher than the second threshold.

13 Claims, 6 Drawing Sheets

METHOD AND A DEVICE FOR ACKNOWLEDGING DATA RECEIVED BY A COMMUNICATION DEVICE IN A COMMUNICATION NETWORK

The present invention relates to a method and a device for acknowledging data received by a communication device in a communication network.

The present invention also relates to a method and a device for processing the data acknowledgements.

In communication systems such as wireless communication networks made up of several communication devices, it is necessary to know whether the data transferred in the communication network are received properly by the other communication devices. To this end, mechanisms for acknowledging the transmitted data have been created.

These acknowledgement mechanisms use a significant portion of the communication network's bandwidth.

The aim of the invention is to resolve the drawbacks of the prior art by proposing a method and a device for acknowledging data which use only a limited portion of the communication network's bandwidth for transferring acknowledgements.

The aim of the invention is also to propose a method and a device which use the acknowledgements to determine communication devices relaying data packets transferred by a source communication device for a destination communication device.

To this end, according to a first aspect, the invention proposes a method for acknowledging data received by a communication device in a communication network, the data being received by data packets, with each packet comprising a plurality of data blocks, characterized in that the method comprises the steps, carried out by the communication device, of:
  determining, for a packet, the number of data blocks whose data can be processed correctly,
  sending an acknowledgement for at least one data block in the packet if the number of data blocks whose data can be processed correctly is between a first and a second threshold, the first threshold being lower than the second threshold, and
  sending, for the data packet, a piece of information at packet level representing the number of data blocks whose data can be processed correctly if the number of data blocks whose data can be processed correctly is lower than the first threshold or higher than the second threshold.

Correlatively, the present invention relates to a device for acknowledging data received by a communication device in a communication network, the data being received by data packets, with each packet comprising a plurality of data blocks, characterized in that the acknowledgement device has:
  means for determining, for a packet, the number of data blocks whose data can be processed correctly,
  means for sending an acknowledgement for at least one data block in the packet if the number of data blocks whose data can be processed correctly is between a first and a second threshold, the first threshold being lower than the second threshold, and
  means for sending, for the data packet, a piece of information at packet level representing the number of data blocks whose data can be processed correctly if the number of data blocks whose data can be processed correctly is lower than the first threshold or higher than the second threshold.

Thus, a limited portion of the communication network's bandwidth is used.

According to one specific form of the invention, an acknowledgement is sent for each data block in the data packet if the number of data blocks whose data can be processed correctly is between the first and the second threshold.

Thus, it is possible to know precisely which data blocks can be processed correctly. Only the data blocks which cannot be processed correctly will be retransmitted.

According to one specific form of the invention, the acknowledgement sent for a data block is a positive acknowledgement if the data in the data block can be processed correctly.

According to one specific form of the invention, the piece of information representing the number of data blocks whose data can be processed correctly takes two values: a first value representing a large number of data blocks whose data can be processed correctly and a second value representing a limited number of data blocks Whose data can be processed correctly.

Thus, it is possible to determine whether or not the communication device is capable of processing data without a large portion of the communication network's bandwidth being used.

According to one specific form of the invention, the data packet is also transferred to another communication device.

Thus, it is possible to determine whether the communication device is capable of relaying data without a large portion of the communication network's bandwidth being used.

According to one specific form of the invention, a plurality of data packets are received and transferred by the communication device, and a predetermined number of data packets whose number of data blocks whose data can be processed correctly is between the first and the second threshold is selected and an acknowledgement is sent for at least one data block in each selected packet.

Thus, it is possible to know precisely which data blocks can be processed correctly. Only data blocks which cannot be processed correctly will be retransmitted.

One specific form of the invention involves sending, for at least one data block in each unselected packet whose number of data blocks whose data can be processed correctly is between the first and the second threshold, another piece of information by packet representing the number of data blocks whose data can be processed correctly.

Thus, it is possible to avoid an excessively large portion of the communication network's bandwidth being used for acknowledgements.

According to one specific form of the invention, the other piece of information representing the number of data blocks whose data can be processed correctly takes another value representing an average number of data blocks whose data can be processed correctly.

According to one specific form of the invention, the data in a data block are determined as being able to be processed correctly by carrying out the steps of:
  reading a previously received copy of the data block,
  determining the number of symbols which have a different value in the data block and the copy which has been read,
  and the data in a data block are determined as being able to be processed correctly if the number of symbols which have a different value in the data block and the copy which has been read is lower than or equal to the correction capacity of the communication device.

Thus, it is possible to determine which are the communication devices which are most capable of relaying data. Moreover, by determining which are the communication devices which are most capable of relaying data, a limited portion of the communication network's bandwidth is used.

According to one specific form of the invention, the communication device receives in response to previously transferred data packets by the communication device, information or acknowledgements from other communication devices and the communication device:

classifies the other communication devices as a function of the information and/or the acknowledgements that the other communication devices have sent, determines the communication devices relaying data packets transferred by a source communication device for a destination communication device from the classified other communication devices.

The invention also relates to computer programs having instructions which allow the previously described methods to be implemented, when they are loaded and executed by a computer system. The programs can be provided on an information medium or a storage medium such as a CD-ROM or a memory card. Alternately, the information medium can be a transmission means such as a signal transmitted over a network.

The features of the invention which have been mentioned above, and others, will appear more clearly upon reading the following description of an exemplary embodiment, said description being given with reference to the appended drawings, among which.

The communication system is a radio communication network which preferably uses a frequency spectrum around 60 GHz. The communication network as shown in the example in FIG. 1 has nine communication devices SCM0 to SCM8. The communication devices will subsequently be called synchronous communication modules SCM0 to SCM8. The synchronous communication modules SCM0 to SCM8 form part of a home cinema system.

Figure 1:
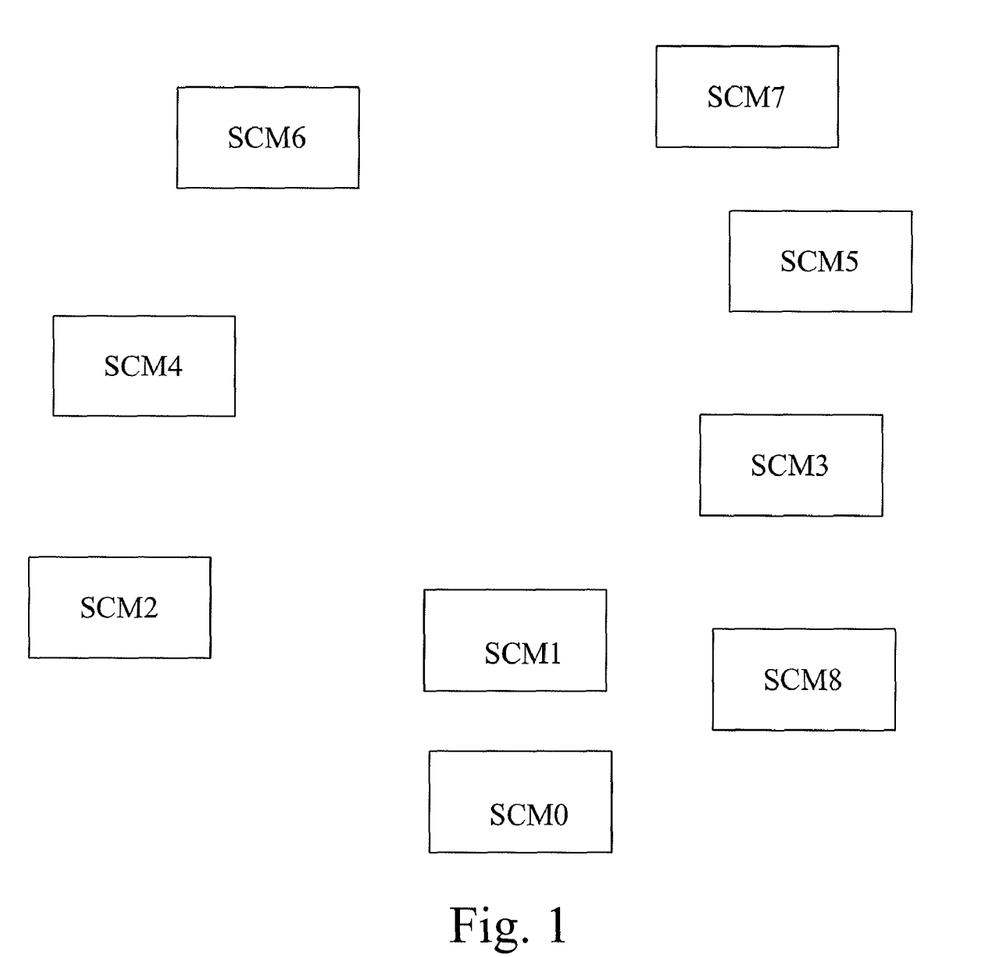
FIG. 1 shows a communication system in which the present invention is implemented.

By way of example, the telecommunication network is used to transfer audio-visual data. When the audio-visual data are audio data, the synchronous communication module SCM0 is part of an audio-visual reproduction system such as a flat-screen television, for example, and transfers audio data to the synchronous communication modules SCM1 to SCM8. The synchronous communication modules SCM1 to SCM8 are respectively part of an audio reproduction device made up of at least one loudspeaker.

The communication modules are referred to as synchronous because they send or receive, as will be explained later, packets in turn and at times which are known by all the communication modules.

When the communication network is used to transfer audio data, it is placed in a room of a house. When people move about the room or when the arrangement of the synchronous communication modules SCM is changed in the room, or when furniture is added, removed or moved in the room, the communication conditions between the synchronous communication modules SCM are changed. These changes mean that data received may no longer be processed correctly.

FIG. 1 shows nine synchronous communication modules SCM. Of course, the communication network may comprise a greater or lesser number of synchronous communication modules SCM.

Figure 4:
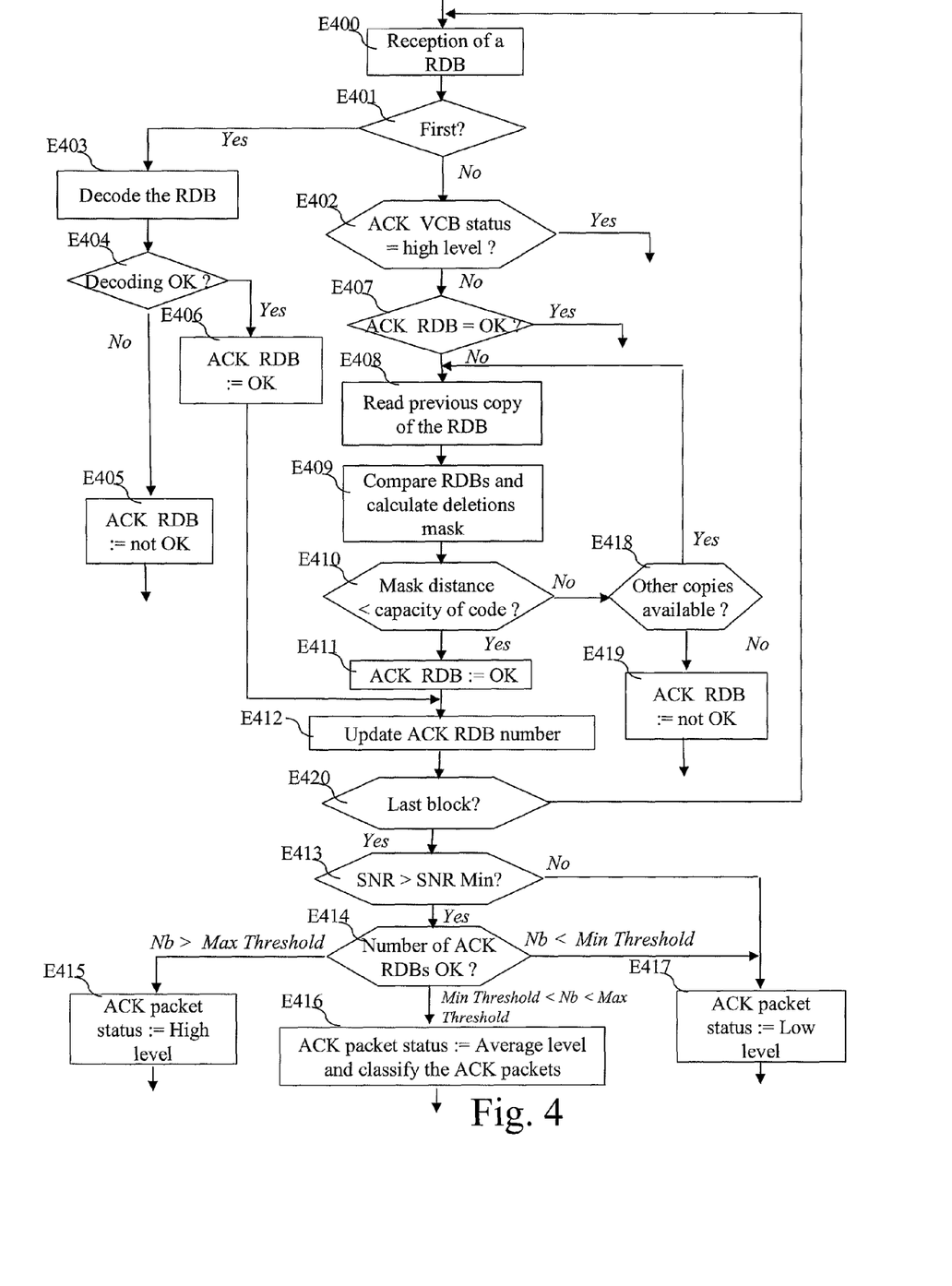
FIG. 4 shows an algorithm for determining the type of acknowledgement to be transferred in response to a received data packet.
Figure 5:
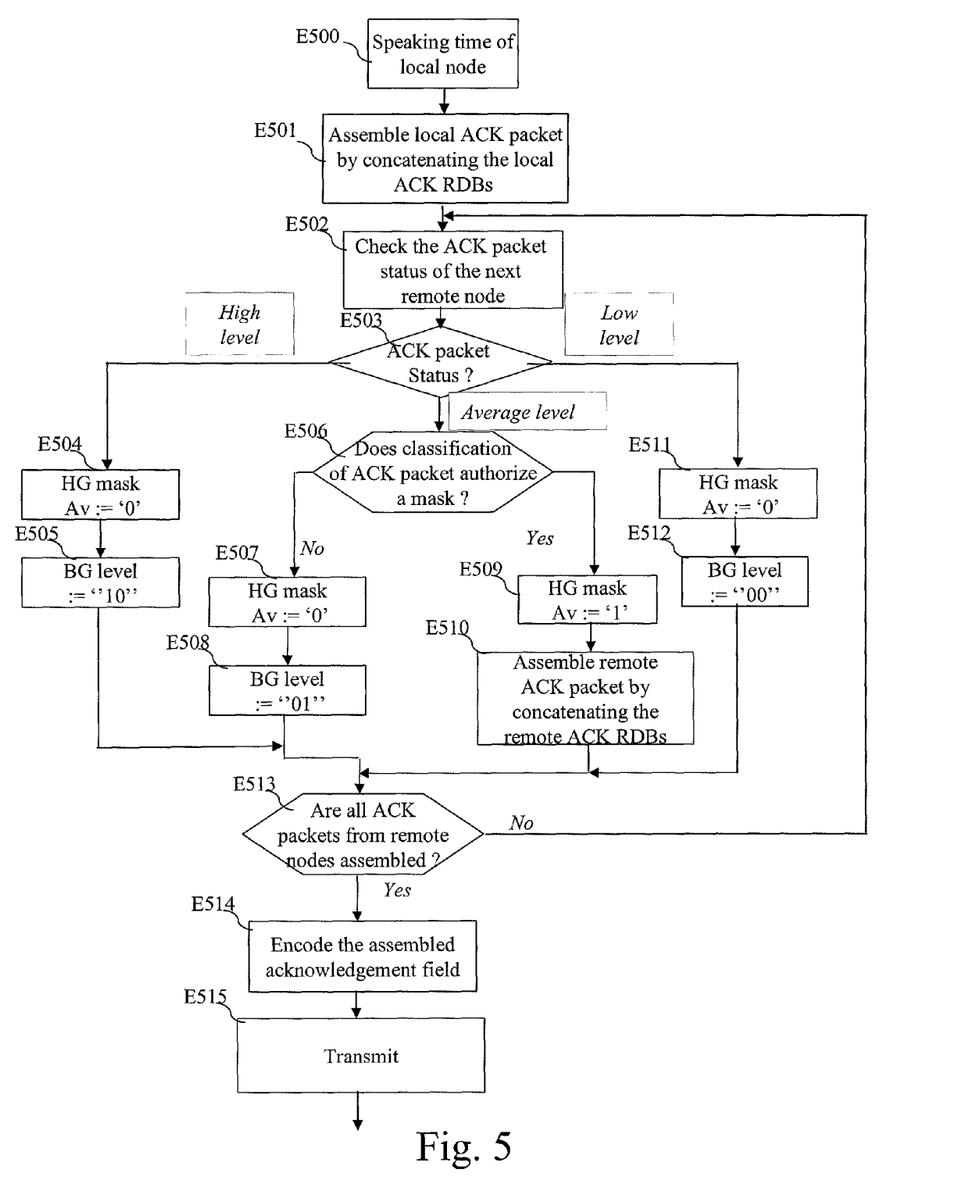
FIG. 5 shows an algorithm for forming an acknowledgement field based on the present invention.

Hence, a synchronous communication module SCM will be called a local synchronous communication module when it receives the data packet processed according to the algorithm in FIG. 4 or sends a packet according to the algorithm in FIG. 5.

Figure 2:
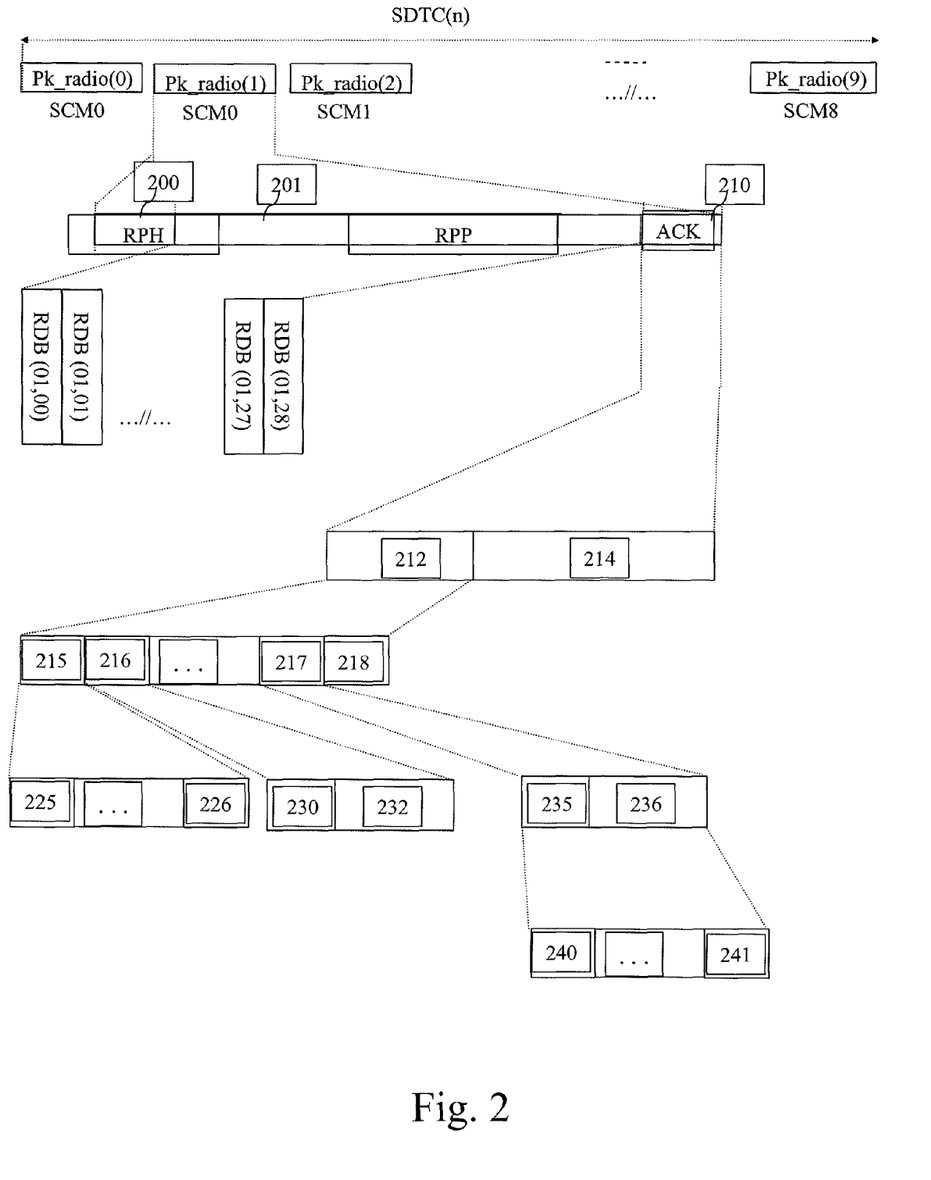
FIG. 2 shows an example of the radio packets organized into data blocks, by means of a timing representation.

FIG. 2 shows an example of the radio packets organized into radio data blocks, by means of a timing representation.

The n-th synchronous data transmission cycle SDTC(n) is shown in FIG. 2. Ten data packets Pk_radio(0) to Pk_radio(9) are transmitted in the synchronous data transmission cycle SDTC(n).

The data packets Pk_radio(0) and Pk_radio(1) are transmitted by the synchronous communication module SCM0, the data packets Pk_radio(2) to Pk_radio(9) are transmitted by the synchronous communication modules SCM2 to SCM8, respectively.

Each data packet Pk_radio has a header field RPH (Radio Packet Header) 200 comprising information from protocols required particularly for managing the access control for each synchronous communication module SCM. Each data packet Pk_radio has also a useful data field RPP (Radio Packet Payload) 201 and an acknowledgement field ACK 210.

Only the data packet Pk_radio(1) will be described below, since the other data packets Pk_radio(0), Pk_radio(2) to Pk_radio(9) have the same architecture.

The useful data field RPP 201 comprises, inter alia, a set of data blocks RDB (01,00) to RDB (01,28).

The acknowledgement field 210 is made up of a local acknowledgement field 212 relating to the data received by the local synchronous communication module SCM and of a relayed acknowledgements field 214. The relayed acknowledgements field 214 comprises a copy of the local acknowledgements received from the other synchronous communication modules SCM.

The local acknowledgement field 212 is made up of an acknowledgement field 215 for the data packet intended for the local synchronous communication module SCM, of acknowledgement fields for the data packets 216 to 217 respectively intended for each of the other synchronous communication modules SCM, and of a field 218 for correcting errors in the fields 215 to 217.

The acknowledgement field 215 for the data packet intended for the local synchronization communication module SCM is made up of an acknowledgement field for each of the data blocks RDB in the data packet (fields 225 to 226, for example) received by the local synchronous communication module SCM. When an acknowledgement field comprises a value equal to '1', the corresponding data block RDB has been received correctly by the local synchronous communication module SCM. A zero value means that the corresponding data block RDB has not been received correctly by the local synchronous communication module SCM.

Each acknowledgement field 216 to 217 for the data packets intended for each of the other synchronous communication modules SCM has one of the following two formats:

A: An acknowledgement mask presence field 230, referred to as High Definition, or ACK Mask HD, and an acknowledgement field referred to as Low Definition 232. The value '0' in the field 230 means that the data packet under consideration has not been acknowledged at data block RDB level but that a piece of information representing the number of data blocks RDB whose data can be processed correctly has been inserted into the field 232. When the information takes the value "00", this means that the number of data blocks RDB whose data can be processed correctly is relatively small, for example lower than Min Threshold=500% of the total number of data blocks RDB making: up the data packet under consideration. When the information takes the value "01", this means that the number of data blocks RDB whose data can be processed correctly is average, for example between Min Threshold and Max Threshold=90% of the total number of data blocks RDB making up the data packet under consideration. When the information takes the value "10", this means that the number of data blocks RDB whose data can be processed correctly is large, for example higher than Max Threshold for the total number of data blocks RDB making up the data packet under consideration. When the information takes the value "11", this means that the data packet to be acknowledged has not been received by the local synchronous communication module.

B: A High-Definition acknowledgement mask presence field 235, or ACK Mask HD, and a high-level acknowledgement field 236. The value '1' in the field 235 thus means that the data packet under consideration has been acknowledged at data block RDB level in the field 236.

Fields 230 and 235 are both. High-Definition acknowledgement mask presence fields but they contain a different value which indicates the field type associated to the High-Definition acknowledgement mask presence field. When the High-Definition acknowledgement mask presence field has a value equal to '0' as it is indicated for field 230, this indicates that the acknowledgement filed 232 if of the first type (Low Definition). In a High-Definition acknowledgement field 236, each of the data blocks RDB relating to the received data packet is acknowledged through the sub-fields 240 to 241 for acknowledging the data blocks RDB, or ACK RDB. A value equal to '1' for such a sub-field means that the corresponding data block RDB has been received correctly by the local synchronous communication module SCM, a zero value meaning that the corresponding data block RDB has not been received correctly by the local synchronous communication module SCM.

It should be noted here that Min Threshold may be between 30 and 70% and Max Threshold may be between 75 and 95%.

Figure 3:
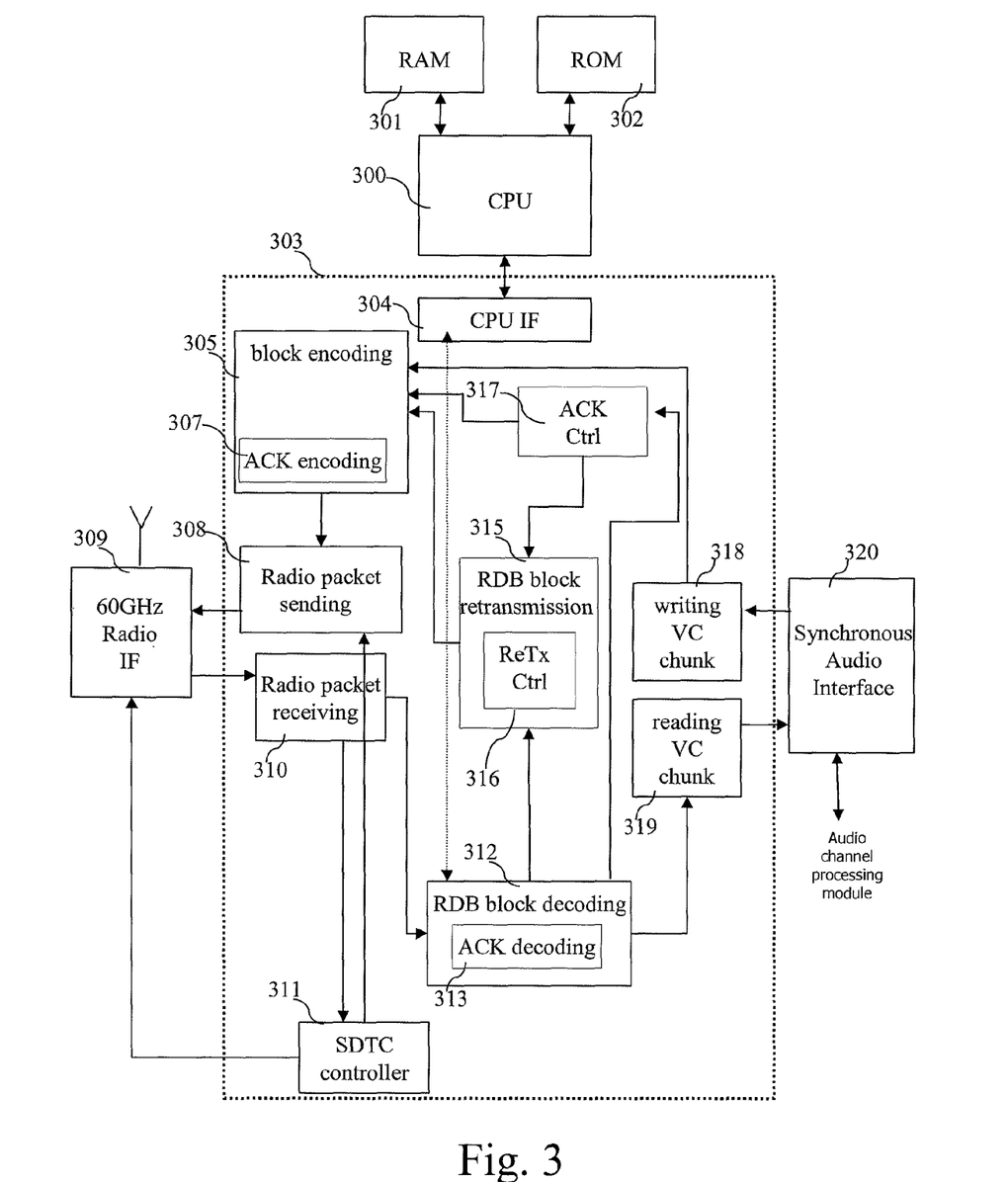
FIG. 3 shows a communication device in which the present invention is implemented.

FIG. 3 shows a synchronous communication module in which the present invention is implemented.

Each synchronous communication module SCMi, where i=0 to 8, is made up of a processor CPU (Central Processing Unit) 300 with which an execution memory block RAM 301 and a non-volatile memory block ROM 302 are associated.

The processor 300 communicates with a communication block 303 through an interface CPU IF 304, which manages particularly the interrupts intended for the processor 300 and the data interchanges between the various elements of the communication block 303 and the processor 300.

The communication block 303 transfers the synchronous data between a 60 GHz radio interface block 309 and a synchronous interface block 320 to/from an audio channel processing module, which is either a digital audio channel restitution means (digital audio channel amplifier) or a multichannel audio (decoder (surround sound decoder).

The communication block 303 also has a writing block 318 and a reading block for data packets 319.

The communication block 303 also has a block 308 for sending data packets and a block 310 for receiving data packets. The block 308 incorporates particularly the functions of modulation, for example of OFDM type, and convolutional encoding, for example through polynomial division in the body of the binary elements, and the block 310 implements the inverse functions of the ones implemented in block 308, particularly of demodulation and of Viterbi decoding.

The communication block 303 also has a synchronization block 311 which controls the regular concatenation of the transmission cycles SDTC relative to the data packets received in order to guarantee perfectly synchronous access to the transmission channel for the purpose of sending data packets. This mechanism allows data packets to be processed during a complete synchronous data transmission cycle, SDTC, when being sent/received.

The communication block 303 also has a block 305 for encoding data blocks RDB.

The communication block 303 also has a retransmission block 315 which selects the data blocks RDB to be retransmitted in accordance with an acknowledgements control block 317 so as to retransmit only the data blocks RDB intended for the synchronous communication modules SCM in the communication network whose local synchronous communication module SCM is a retransmitter. This function is more particularly provided by the submodule ReTx controller 316 which is part of the retransmission block 315. The retransmission block 315 is also responsible for assembling the acknowledgement fields 210, 212 and 214 from FIG. 2 and the field 218 generated by the acknowledgements encoding submodule 307.

The acknowledgements control block 317 is responsible for interpreting all the acknowledgements received so as to determine the retransmission lists for each of the other synchronous communication modules SCM in the communication network. The acknowledgements control block 317 also defines the acknowledgement fields 212 and 214 for the local synchronous communication module SCM.

It will moreover be noted that the retransmission task is shared between the various synchronous communication modules, on the basis of the number of data blocks RDB available for each of the synchronous communication modules SCM.

The decoding block 312 processes the data blocks RDB. The decoding block 312 comprises an acknowledgement decoding block 313 responsible for processing the acknowledgements which are present in the acknowledgement field 210.

FIG. 4 shows an algorithm for determining the type of acknowledgement to be transferred in response to a received data packet.

The present algorithm is more precisely executed by the acknowledgements control block 317 of each communication module SCM.

In step E400, a data block RDB is received, this block is stored in memory.

In the next step E401, the control block 317 checks whether the data block RDB has previously been received.

According to the invention, data blocks are relayed and transmitted several times by at least part of the other synchronous communication modules SCM so that to avoid any loss of data. Data blocks are therefore received several times by a same synchronous communication modules SCM.

If the received data block RDB has already been previously received, the control block 317 moves to step E402. If not, the received data block RDB is transferred to the RDB decoding module 312 and an attempt at processing the data block, such as decoding the data in the data block, is made in step E403.

In the next step E404, the control block 317 checks whether the RDB decoding module 312 can decode the data in the received data block RDB.

If the RDB decoding module 312 can decode the data in the received data block RDB, the control block 317 moves to step E406, and the status of the received data block RDB is marked correct or "OK".

Once this operation has been performed, the control block 317 then moves to step E412 for updating the status of the data blocks RDB in the data packet and for updating the number of data blocks RDB whose data can be processed correctly.

If the RDB decoding module 312 is not able to decode the data in the data block RDB, the control block 317 moves from step E404 to step E405, where the control block 317 marks the status of the received data block RDB as incorrect or "not OK" and memorises the data block RDB.

Once this operation has been performed, the control block 317 returns to step E400 so as to process a new data block RDB.

In step E402, the control block 317 checks whether the reception level for the data packet comprising the received data block RDB is marked at the high level. The various levels for the data packets will be described later with reference to steps E415 to E417.

If the data packet comprising the received data block RDB is marked at the high level, the control block 317 returns to step E400 in order to process a new data block RDB.

If the level of the data packet comprising the received data block RDB is not high, the control block 317 moves to step E407.

In step E407, the control block 317 checks whether the received data block RDB has a status marked as correct "OK". If this is the case, the algorithm returns to step E400 in order to process a new data block RDB.

In the opposite case, a copy of the previously received data block RDB is read in step E408 from the RAM memory 301 of the local synchronous communication module SCM and is compared in step E409 with the received data block RDB in order to determine a deletions mask for the received data block RDB. A deletion mask indicates which symbols are indeterminate and their position within the received data block RDB. A symbol is referred to as indeterminate when the comparison between the symbol in the received data block RDB and the symbol at the same position in the data packet which has been read shows that they have different values.

In the next step E410, the control block 317 checks whether the number of indeterminate symbols is less than or equal to the correction capacity of the RDB decoding block 312.

If the number of indeterminate symbols is greater than the correction capacity of the RDB decoding block 312, the control block 317 moves to step E418 and the control block 317 checks whether another copy of the data block RDB is stored in the RAM memory 301 of the local synchronous communication module SCM.

If so, the control block 317 returns to step E408 of the present algorithm.

If not, the control block 317 moves to step E419 or the control block 317 marks the status of the received data block RDB as incorrect or "not OK". The control block 317 then returns to step E400 in order to process a new data block RDB.

If the number of indeterminate symbols is less than or equal to the correction capacity of the RDB decoding block 312, the control block 317 moves to step E412 and the control block 317 updates the status of the data blocks RDB in the data packet and the number of data blocks RDB whose data can be processed correctly.

In the next step E420, the control block 317 checks whether the received data block RDB is the last in the data packet currently being processed. If this is the case, the control block 317 moves to step E413. In the opposite case, the control block 317 returns to step E400.

In step E413, the control block 317 checks whether the signal-to-noise ratio (SNR) between the local synchronous communication module SCM and the synchronous communication module SCM to which the received data block RDB needs to be relayed is higher than a predetermined threshold called SNR Min.

If the signal-to-noise ratio is higher than the threshold SNR Min, the control block 317 moves to step E414. If the signal-to-noise ratio is lower than or equal to the threshold SNR Min, the control block 317 moves to step E417.

In step E417, the control block 317 marks the level for the data packet comprising the received data block RDB at the low level.

Once this operation has been performed, the control block 317 returns to step E400 in order to process a new data block RDB.

In step E414, the control block 317 compares, for the data packet comprising the received data block RDB, the number of data blocks RDB in the data packet whose data can be processed correctly. Particularly, the number of data blocks RDB in the data packet which have an acknowledgement status "OK" is compared to a first and/or at a second predetermined threshold.

If the number of data blocks RDB whose data can be processed correctly is lower than the first threshold, called Min Threshold, the control block 317 moves to step E417, described previously.

If the number of data blocks RDB whose data can be processed correctly is higher than or equal to the first Min Threshold and lower than the second Max Threshold, the control block 317 moves to step E416.

If the number of data blocks RDB in the data packet whose data can be processed correctly is higher than or equal to Max Threshold, the control block 317 moves to step E415.

In step E415, the control block 317 marks the reception level for the corresponding data packet as "high". Once this operation has been performed, the control block 317 returns to step E400 in order to process a new data block RDB.

In step E416, the control block 317 marks the reception level for the corresponding data packet as "average", and the control block 317 classifies the marked data packets as average.

In fact, in accordance with one specific embodiment, the acknowledgement field 210 has a fixed size. This fixed size can, in some cases, limit the number of fields such as the field 236 which are able to be included in the acknowledgement field 210.

Thus, the various received data packets are, firstly, organized on the basis of the smallest to the greatest number of data blocks RDB which can be processed. Secondly, the control block 317 selects the Nmax first organized data packets and the control block 317 authorizes acknowledgement for each data block RDB in the data packet as shown by the field 236 in FIG. 2. For the other data packets, the control block 317 does not authorize acknowledgement for each data block RDB in the data packet.

When step E416 or E415 is performed, the control block 317 returns to step E400 in order to process a new data block RDB.

FIG. 5 shows an algorithm for forming the acknowledgement field 212 in FIG. 2.

The present algorithm is more precisely executed by the acknowledgements control block 317 of each synchronous communication module SCM.

Step E500 involves waiting for the time at which the current synchronous communication module SCM can transfer a data packet in the transmission cycle SDTC(n).

In step E501, the control block 317 acknowledges the data packet intended for the local synchronous communication module SCM by concatenating the acknowledgements for the data blocks RDB in the data packet in order to form a field 215 as shown in FIG. 2.

In step E502, the control block 317 obtains the status of the data packet needing to be acknowledged in the next acknowledgement field 216 to 217 and intended for another synchronous communication module SCM.

In step E503, the control block 317 determines whether the reception level for the data packet needing to be acknowledged in the next acknowledgement field is marked as "high", "average" or "low". If the level for the data packet needing to be acknowledged in the next acknowledgement field is marked as "high", the control block 317 moves to step E504. If the level for the data packet needing to be acknowledged in the next acknowledgement field is marked as "average", the block 317 moves to step E506. If the level for the data packet needing to be acknowledged in the next acknowledgement field is marked as "low", the control block 317 moves to step E511.

In step E504, the block 317 inserts the binary value "0" into the field 230 in FIG. 2.

In the next step E505, the control block 317 inserts the binary value "10" into the Low Definition acknowledgement field 232 in FIG. 2.

Once this operation has been performed, the control block 317 moves to step E513.

In step E511, the control block 317 inserts the binary value "0" into the field 230 in FIG. 2.

In the next step E512, the control block 317 inserts the binary value "00" into the field 232 in FIG. 2.

Once this operation has been performed, the control block 317 moves to step E513.

In step E506, the control block 317 checks whether an acknowledgement is authorized for each data block RDB in the data packet currently being processed.

If an acknowledgement is authorized for each data block RDB in the data packet currently being processed, the control block 317 moves to step E509.

If an acknowledgement is not authorized for each data block RDB in the data packet currently being processed, the block 317 moves to step E507.

In step E509, the control block 317 inserts the binary value "1" into the field 235 (ACL Mask HD) in FIG. 2.

In the next step E510, the control block 317 inserts a piece of binary information representing the status of the corresponding data block RDB into each sub-field 240 to 241 in FIG. 2. The binary value "0" corresponds to a data block RDB marked incorrect or "not OK", and the binary value "1" corresponds to a data block RDB marked correct or "OK".

Once this operation has been performed, the control block 317 moves to step E513.

In step E507, the control block 317 inserts the binary value "0" into the field 230 in FIG. 2.

In the next step E508, the control block 317 inserts the binary value "01" into the field 232 in FIG. 2.

Once this operation has been performed, the control block 317 moves to step E513.

In step E513, the control block 317 checks whether all the fields 216 to 217 have been processed.

If all the fields 216 to 217 have been processed, the control block 317 moves to step E514. Otherwise, the control block 317 returns to step E502.

In step E514, the fields 215 to 217 are assembled and encoded in order to obtain the content of the field 218.

In step E515, the fields formed in this manner are transferred in the transmitted data packet.

Figure 6:
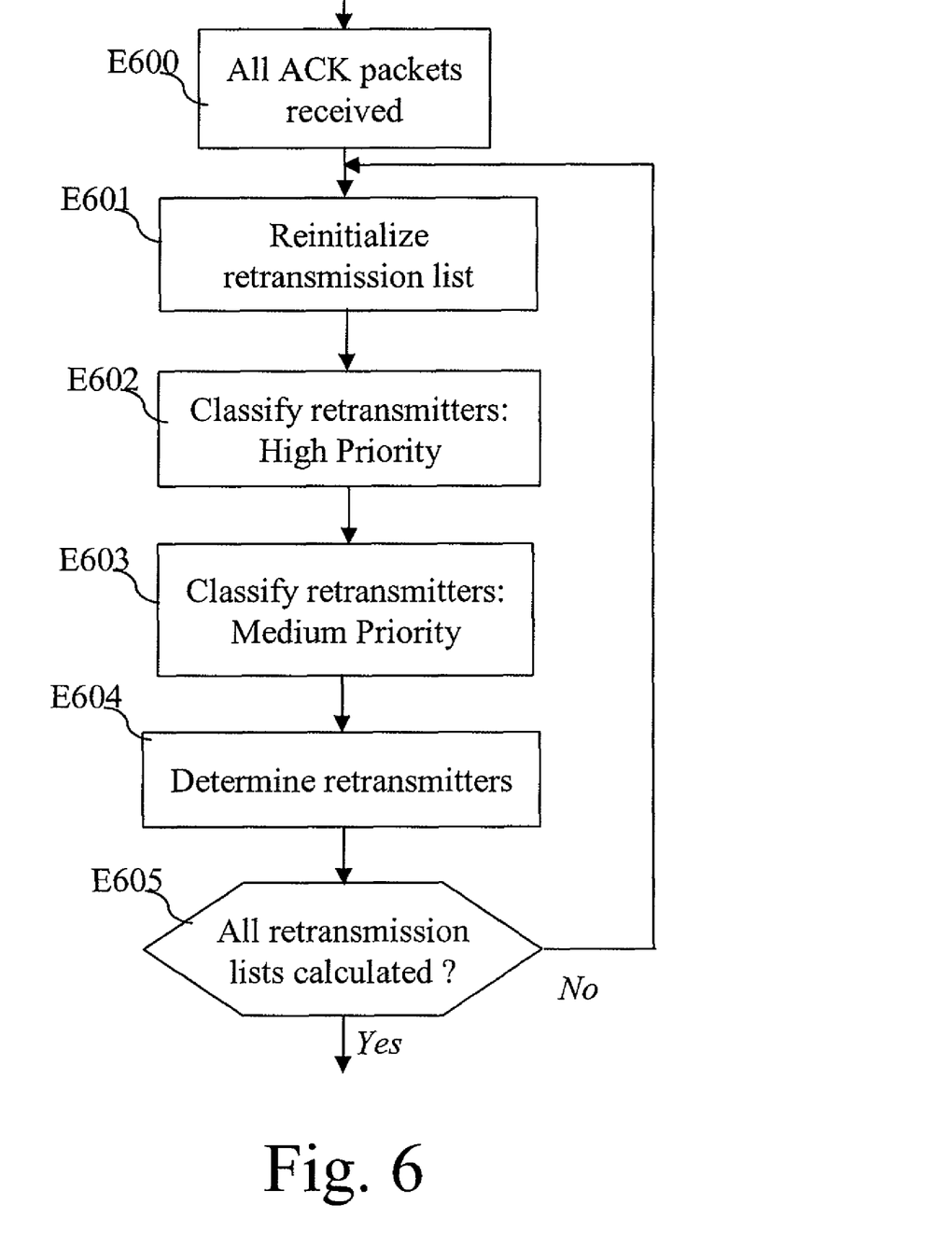
FIG. 6 shows an example algorithm for processing acknowledgements or information representing the number of data blocks whose data can be processed correctly.

FIG. 6 shows an example algorithm for processing acknowledgements or information representing the number of data blocks whose data can be processed correctly.

The present algorithm describes a method for selecting synchronous communication modules SCM which are intended to relay data transferred by a source synchronous communication module SCM to a destination synchronous communication module SCM from a classification of the communication devices as a function of information and/or acknowledgements which have been transmitted by the communication devices.

The present algorithm allows thus to determine what are the most capable communication devices for relaying data. By determining what are the most capable communication devices for relaying data, a limited portion of the communication network bandwidth is used.

The present algorithm describes, firstly, the establishing of the list of synchronous communication modules SCM that will relay the information that the local synchronous communication module SCM transmits.

The present algorithm is more precisely executed by the acknowledgements control block 317 for each communication module SCM.

In step E600, the control block 317 detects the reception of each acknowledgement field 210 in each data packet Pk_radio sent by the other synchronous communication modules SCM in a transmission cycle SDTC.

In the next step E601, the control block 317 initializes a retransmission list for each synchronous communication module SCM. A retransmission list comprises the identifiers of the synchronous communication modules SCM which are used as relays between the source synchronous communication module and the destination synchronous communication module SCM.

In the next step E602, the control block 317 identifies, firstly, the synchronous communication modules SCM which have transferred a data packet reception level marked as "high", or in other words which have inserted the binary value "0" into the field 230 in FIG. 2 and the binary value "10" into the field 232.

The control block 317 classifies the synchronous communication modules SCM identified according to at least a predetermined criterion.

For this, it is possible to use one or more of the following criteria: the unique identifier of each of the synchronous communication modules SCM, a unique priority level for the synchronous communication modules SCM, etc.

This list of criteria is not exhaustive, and the person skilled in the art will thus be able to consider other classification criteria.

In the next step E603, the control block 317 identifies the synchronous communication modules SCM which have transferred a data packet reception level marked as "average", or in other words which have inserted the binary value "0" into the field 230 in FIG. 2 and the binary value. "01" into the field 232, or which have inserted the binary value "1" into the field 235 in FIG. 2.

The control block 317 classifies the synchronous communication modules SCM identified in step E603 behind the synchronous communication modules SCM sorted in step E602.

The synchronous communication modules SCM which have inserted the binary value "1" into the field 235 in FIG. 2 are classified first. The synchronous communication modules SCM which have inserted the binary value "1" into the field 235 in FIG. 2 are classified on the basis of the number of data blocks RDB which are acknowledged positively in the field 236. When there is equality between at least two synchronous communication modules SCM, the classification can also be made according to the criteria mentioned in step E602.

The synchronous communication modules SCM which have inserted the binary value "0" into the field 230 in FIG. 2 and the binary value "01" into the field 232 are classified behind the synchronous communication modules SCM which have inserted the binary value "1" into the field 235 in FIG. 2. The classification of the synchronous communication modules SCM which have inserted the binary value "0" into the field 230 in FIG. 2 and the binary value "01" into the field 232 is made according to the criteria mentioned in step E602.

In a next step E604, the control block 317 finally determines the retransmission list which comprises the synchronous communication modules SCM which will relay the information sent by the local synchronous communication module SCM. To do this, the control block 317 considers a number $R_{max}$ of retransmitting synchronous communication modules SCM. $R_{max}$ has a value defined previously and common to each of the synchronous communication modules SCM. Thus, the $R_{max}$ first synchronous communication modules SCM classified in step E602 and E603 are included in the retransmission list.

The steps E601 and E604 also allow, according to the invention, the local communication device SCM to determine the list of synchronous communication modules SCM that will relay the information transmitted by each other synchronous communication module SCM from the fields 216 to 217 in FIG. 2 which are bound to, respectively, each other synchronous communication module SCM. This allows thus the local communication device SCM to determine if it is not included in at least one of those lists.

In the next step E605, the control block 317 checks whether each list of the synchronous communication modules SCM that will relay the information transmitted by each other synchronous communication module SCM has been determined.

If this is not the case, the control block 317 returns to step E601 and considers the fields 216 to 217 in FIG. 2 which are bound to the synchronous communication module SCM for which the retransmission list will be determined.

If step E605 determines that all retransmission lists have been determined, the algorithm is interrupted.

This application claims priority from French application Ser. No. 07/08915 filed on 20 Dec. 2007, which is incorporated by reference in its entirety.

The invention claimed is:

1. A method for acknowledging data received by a communication device in a communication network, the data being received by receipt of data packets, with each data packet comprising a plurality of data blocks, the method, being carried out by the communication device, comprising:
   determining, for a data packet, a number of data blocks whose data can be processed correctly;
   sending an acknowledgement for at least one data block in the data packet if the determined number of data blocks whose data can be processed correctly is between a first threshold and a second threshold, the first threshold being lower than the second threshold; and
   sending, for the data packet, an acknowledgement including a piece of information at packet level representing the number of data blocks whose data can be processed correctly if the determined number of data blocks whose data can be processed correctly is lower than the first threshold or higher than the second threshold.

2. The method according to claim 1, wherein an acknowledgement is sent for each data block in the data packet if the number of data blocks whose data can be processed correctly is between the first threshold and the second threshold.

3. The method according to claim 1, wherein the acknowledgement sent for a data block is a positive acknowledgement if the data in the data block can be processed correctly.

4. The method according to claim 1, wherein the piece of information representing the number of data blocks whose data can be processed correctly takes two values: a first value representing a large number of data blocks whose data can be processed correctly and a second value representing a limited number of data blocks whose data can be processed correctly.

5. The method to claim 1, wherein the data packet is also transferred to another communication device.

6. The method according to claim 1, wherein a plurality of data packets are received and transferred by the communication device, and wherein the method further comprises:
   selecting a predetermined number of data packets whose number of data blocks whose data can be processed correctly is between the first and the second threshold; and
   sending an acknowledgement for at least one data block in each selected packet.

7. The method according to claim 6, wherein the method further comprises:
   sending, for at least one data block in each unselected packet whose number of data blocks whose data can be processed correctly is between the first threshold and the second threshold, another piece of information by packet representing the number of data blocks whose data can be processed correctly.

8. The method according to claim 7, wherein the other piece of information representing the number of data blocks whose data can be processed correctly takes another value representing an average number of data blocks whose data can be processed correctly.

9. The method according to claim 1, wherein the data in a data block are determined as being able to be processed correctly by:
   reading a previously received copy of the data block; and
   determining the number of symbols which have a different value in the data block and the copy which has been read, wherein the data in a data block are determined as being able to be processed correctly if the number of symbols which have a different value in the data block and the copy which has been read is lower than or equal to a correction capacity of the communication device.

10. The method according to claim 1, wherein the communication device in a communication network receives in response to previously transferred data packets by the communication device, information or acknowledgements from other communication devices, and wherein the method further comprises:
   classifying of the other communication devices as a function of the information and/or the acknowledgements that the other communication devices have sent; and
   determining the communication devices relaying data packets transferred by a source communication device for a destination communication device from the classified other communication devices.

11. A device for acknowledging data received by a communication device in a communication network, the data being received by receipt of data packets, with each data packet comprising a plurality of data blocks, wherein the acknowledgement device comprises:

means for determining, for a data packet, a number of data blocks whose data can be processed correctly;

means for sending an acknowledgement for at least one data block in the data packet if the determined number of data blocks whose data can be processed correctly is between a first threshold and a second threshold, the first threshold being lower than the second threshold; and means for sending, for the data packet, an acknowledgement including a piece of information at packet level representing the number of data block whose data can be processed correctly if the determined number of data blocks whose data can be processed correctly is lower than the first threshold or higher than the second threshold.

12. A non-transitory computer-readable storage medium storing a program which, when loaded and executed by a computer or a processor in a device, allows the device to implement a method for acknowledging data received by a communication device in a communication network, the data being received by receipt of data packets, with each data packet comprising a plurality of data blocks, the method, carried out by the communication device, comprising:

determining, for a data packet, a number of data blocks whose data can be processed correctly;

sending an acknowledgement for at least one data block in the data packet if the determined number of data blocks whose data can be processed correctly is between a first threshold and a second threshold, the first threshold being lower than the second threshold; and sending, for the data packet, and acknowledgement including a piece of information at packet level representing the number of data blocks whose data can be processed correctly if the determined number of data blocks whose data can be processed correctly is lower than the first threshold or higher than the second threshold.

13. A device for acknowledging data received by a communication device in a communication network, the data being received by receipt of data packets, with each data packet comprising a plurality of data blocks, wherein the acknowledgement device comprises:

a determination unit configured to determine, for a data packet, a number of data blocks whose data can be processed correctly;

a first transmission unit configured to send an acknowledgement for at least one data block in the data packet if the determined number of data blocks whose data can be processed correctly is between a first threshold and a second threshold, the first threshold being lower than the second threshold; and a second transmission unit configured to send, for the data packet, an acknowledgement including a piece of information at packet level representing the number of data blocks whose data can be processed correctly if the determined number of data blocks whose data can be processed correctly is lower than the first threshold or higher than the second threshold.

* * * * *